United States Patent [19]

Pettijohn et al.

[11] Patent Number: 5,393,719
[45] Date of Patent: Feb. 28, 1995

[54] CATALYSTS FOR OLEFIN POLYMERIZATION

[75] Inventors: Ted M. Pettijohn, Bartlesville, Okla.; William K. Reagen, Stillwater, Minn.; Shirley J. Martin, Bartlesville, Okla.

[73] Assignee: Phillips Petroleum Company, Bartlesville, Okla.

[21] Appl. No.: 194,606

[22] Filed: Feb. 10, 1994

Related U.S. Application Data

[62] Division of Ser. No. 976,124, Nov. 13, 1992, Pat. No. 5,331,070.

[51] Int. Cl.$^6$ ............................. C08F 4/24; B01J 31/00
[52] U.S. Cl. ................................. 502/113; 502/117; 502/123; 526/105; 526/106
[58] Field of Search ............... 526/105, 106, 114, 141; 502/117, 123, 113

[56] References Cited

U.S. PATENT DOCUMENTS

| | | | |
|---|---|---|---|
| 3,462,403 | 8/1969 | Pendleton | 260/93.7 |
| 3,534,006 | 10/1970 | Kamaishi et al. | 526/141 |
| 3,985,718 | 10/1976 | Chabert et al. | 526/113 |
| 4,150,208 | 4/1979 | Hwang | 526/96 |
| 4,634,687 | 1/1987 | Fujita et al. | 502/121 |
| 4,668,838 | 5/1987 | Briggs | 585/513 |
| 4,806,513 | 2/1989 | McDaniel et al. | 526/105 |
| 4,988,657 | 1/1991 | Martin et al. | 526/106 |
| 5,198,563 | 3/1993 | Reagan et al. | 556/57 |
| 5,288,823 | 2/1994 | Reagan et al. | 526/124 |
| 5,331,070 | 7/1994 | Pettijohn et al. | 526/105 |

OTHER PUBLICATIONS

J. R. Briggs, The Selective Trimerization of Ethylene to Hex-1-ene, (1989).
D. Tille, Pyrrolylchromium Compounds, (1966).
D. Tille, Organometal Compounds of Nitrogen Systems, (1971).
W. K. Reagen, Chromium (II) & (III) Pyrrolyl Ethylene Oligomerization Catalysts, Synthesis and Crystal Structure of Square Planar $Cr(NC_4H_4)_4^{-2}$, and Pentanuclear $(Cr_5(NC_4H_4)_{10}(OC_4H_8)_4)$.
Kresser, Theodore O. J.; *Polyolefin Plastics* (1969) pp. 5-6.
Billmeyer, Jr., Fred W.; *Textbook of Polymer Science* (1984) pp. 91, 92 and 96.
Boor, Jr., John; *Ziegler-Natta Catalyst and Polymerizations* (1979) pp. 279-284.
Schut, Jan H.; *Plastics Technology* "Why Processors Need to Know How They Make PEs" (Sep. 1993) pp. 68-72.

*Primary Examiner*—Asok Pal
*Attorney, Agent, or Firm*—Lynda S. Jolly

[57] ABSTRACT

Olefins can be polymerized in the presence of a catalyst system composition comprising chromium oxides supported on a inorganic oxide support, a pyrrole-containing compound and a non-hydrolyzed metal alkyl. The use of this type of polymerization catalyst in a polymerization process can produce an olefin comonomer in-situ, resulting in polymers having decreased density and increased branching.

21 Claims, No Drawings

CATALYSTS FOR OLEFIN POLYMERIZATION

This application is a division of application Ser. No. 07/976,124, filed Nov. 13, 1992, now U.S. Pat. No. 5,331,070.

BACKGROUND OF THE INVENTION

This invention relates to the polymerization catalyst systems and polymerization processes for mono-1-olefins.

It is well known that mono-1-olefins, such as ethylene, can be polymerized with catalyst systems employing vanadium, chromium or other metals on inorganic oxide, or refractory, supports. Initially, such catalyst systems were used primarily to form homopolymers of ethylene. It soon developed, however, that many applications required polymers which were more impact resistant than ethylene homopolymers. Consequently, in order to produce polymers having short chain branching, like the more flexible free radical polymerized polymers, comonomers such as propylene, butene, hexene or other higher olefins were copolymerized with the ethylene to provide resins tailored to specific end uses. The copolymers, however, are more expensive to produce since inventories of different monomers must be kept and also the comonomers are generally more expensive than ethylene. Linear ethylene polymers with short chain branching can be formed from a pure ethylene feed using the old free radical high pressure process, but the conditions necessary to do this make the product too expensive to be commercially viable at this time.

Additional control over the polymerization process and the resultant polymer is also desired. A process to consistently reduce the density of linear olefin polymers and to more efficiently produce and incorporate comonomers into the linear olefin polymer is economically advantageous. A shift in the polymer branch distribution, wherein the branch length is decreased and the amount of branching is increased, is also economically desirable.

SUMMARY OF THE INVENTION

Accordingly, it is an object of this invention to provide a low cost route to linear olefin polymers having toughness imparted by short chain branching.

It is a further object of this invention to provide a process by which olefin polymers having properties associated with copolymers can be obtained from a substantially pure, single olefin feed.

It is yet a further object of this invention to provide an improved polymerization process.

It is a further object of this invention to provide a novel polymerization process to control polymer density.

It is yet a further object of this invention to provide a novel polymerization process to improve comonomer production and incorporation into olefin polymers.

In accordance with this invention, a substantially pure, single olefin feed is contacted under polymerization conditions with a polymerization catalyst system composition comprising a transition metal supported on an inorganic oxide support, a pyrrole-containing compound, and a metal alkyl.

DESCRIPTION OF THE PREFERRED EMBODIMENTS

Catalyst Systems

The catalyst support can be any conventional polymerization catalyst support. Preferably, one or more refractory metal oxides comprise the catalyst support. Exemplary refractory metal oxides include, but are not limited to alumina, boria, magnesia, thoria, zirconia, silica, or mixtures thereof. The catalyst support can be prepared in accordance with any method known in the art. Exemplary support method preparations are given in U.S. Pat. Nos. 3,887,494; 3,900,457; 4,053,436; 4,151,122; 4,294,724; 4,392,990; and 4,405,501, the disclosures of which are herein incorporated by reference.

In the description herein the terms "cogel" and "cogel hydrogel" are arbitrarily used to describe cogelled silica and titania, The term "tergel" is used to describe the product resulting from gelation together of silica, titania, and chromium. "Hydrogel" is defined as a support component containing water. "Xerogel" is a support component which has been dried and is substantially water-free. References to "silica" mean a silica-containing material, generally composed of 80 to 100 weight percent silica, the remainder, if any, being selected from the group consisting of alumina, boria, magnesia, thoria, zirconia, or mixtures thereof. Other ingredients which do not adversely effect the catalyst system or which are present to produce some unrelated results can also be present.

The catalyst component must be a chromium compound. The chromium component can be combined with the support component in any manner known in the art, such as forming a co-precipitated tergel. Alternatively, an aqueous solution of a water soluble chromium component can be added to the hydrogel of the support component. Suitable chromium compounds include, but are not limited to, chromium nitrate, chromium acetate, and chromium trioxide. Alternatively, a solution of a hydrocarbon soluble chromium component, such as tertiary butyl chromate, a diarene chromium compound, biscyclopentadienyl chromium (II) or chromium acetylacetonate, can be used to impregnate a xerogel support.

The chromium component is used in an amount sufficient to give about 0.05 to about 5, preferably about 0.5 to about 2 weight percent chromium based on the total weight of the chromium and support after activation.

The resulting chromium component on the support component is then subjected to activation in an oxygen-containing ambient in any manner conventionally used in the art. Because of economy, the preferred oxygen-containing ambient is air, preferably dry air. The activation is carried out at an elevated temperature for about 30 minutes to about 50 hours, at a temperature within a range of about 300° to about 1000° C. preferably about 2 to about 10 hours, at a temperature within a range of about 400° to about 900° C. Under these conditions, at least a substantial portion of any chromium in the lower valent state is converted to the hexavalent form by this calcination procedure.

A preferred, second type of chromium catalyst system is prepared when the resulting previously calcined, supported catalyst system is then cooled and subjected to at least a partial reduction of the hexavalent chromium to a lower valence state. Preferably, a substantial portion of the chromium will be in the divalent state after the reduction process.

The reducing agent must be carbon monoxide. The reducing agent can be employed at temperatures between about 300° to about 500° C. although it is more often employed at temperatures within a range of about 350° to about 450° C. The partial pressure of the reducing gas in the reduction operation can be varied from sub-atmospheric pressures to relatively high pressures, but the simplest reducing operation is to utilize a dilute solution of a pure reducing agent at about atmospheric pressure. Usually, a solution of about 10%, by volume, carbon monoxide in an inert ambient, such as, for example, nitrogen and/or argon can be used.

The reduction time can vary from a few minutes to several hours or more. The extent of reduction can be followed by visual inspection of catalyst system color. The color of the initial oxygen-activated catalyst system is generally orange, indicating the presence of hexavalent chromium. The color of tile reduced catalyst system employed in the invention is blue, indicating that all or substantially all of the initial hexavalent chromium has been reduced to lower oxidation states, generally the divalent state.

The course of the reduction action of the air-activated orange catalyst system with the reducing agent can be determined exactly by pulse titration. A known amount of reducing agent is added per pulse and the amount of evolved oxidized reducing agent is measured. When reduction is complete, only reducing agent will be present and the catalyst is blue in color. The blue reduced catalyst system can be titrated with pulses of oxygen or any oxidizing agent, to convert the catalyst to the original orange color. When oxidation is complete, the oxidizing agent will be evident in the off gas.

After reduction, the reduced, supported catalyst system is cooled to about room temperature, e.g., about 25° C. in an inert atmosphere, such as argon or nitrogen, to flush out reducing agent. After the flushing treatment, the catalyst system is kept away from contact with either a reducing agent or an oxidizing agent.

Catalyst system concentrations in a polymerization reactor are conventional and are usually within a range of about 0.001 to about 10 weight percent, based on the weight of active chromium and the weight of the reactor contents.

The pyrrole-containing compound can be any pyrrole-containing compound. As used in this disclosure, the term "pyrrole-containing compound" refers to hydrogen pyrrolide, i.e., pyrrole, ($C_4H_5N$), derivatives of hydrogen pyrrolide, as well as metal pyrrolide complexes. Broadly, the pyrrole-containing compound can be pyrrole and/or any heteroleptic or homoleptic metal complex or salt, containing a pyrrolide radical, or ligand. A "pyrrolide" is defined as a compound comprising a 5-membered, nitrogen-containing heterocycle, such as, for example, pyrrole, derivatives of pyrrole, and mixtures thereof. Generally, the pyrrole-containing compound will have from about 1 to about 20 carbon atoms per molecule. Exemplary pyrrolides are selected from the group consisting of hydrogen pyrrolide (pyrrole), derivatives of pyrrole, substituted pyrrolides, lithium pyrrolide, sodium pyrrolide, potassium pyrrolide, cesium pyrrolide, and/or the salts of substituted pyrrolides, because of high reactivity and activity with other reactants. Examples of substituted pyrrolides include, but are not limited to pyrrole-2-carboxylic acid, 2-acetylpyrrole, pyrrole-2-carboxaldehyde, tetrahydroindole, 2,5-dimethyl-pyrrole, 2,4-dimethyl-3-ethyl-pyrrole, 3-acetyl-2,4-dimethylpyrrole, ethyl-2,4-dimethyl-5-(ethoxycarbonyl)-3-pyrrole-propionate, ethyl-3,5-dimethyl-2-pyrrole-carboxylate.

The most preferred pyrrole-containing compounds used in this invention are selected from the group consisting of hydrogen pyrrolide ($C_4H_5N$) and/or 2,5-dimethyl pyrrole. While all pyrrole-containing compounds can produce the desired polymer product characteristics, use of pyrrole and/or 2,5-dimethylpyrrole can produce enhanced catalyst system activity.

The amount of pyrrole or pyrrole-containing compound, present in the polymerization reactor can be any amount sufficient to alter the resultant polymer properties. Generally, the molar ratio of moles of active chromium in the polymerization catalyst system to moles of pyrrole-containing compound is within a range of about 1,000,000:1 to about 10:1, preferably, within a range of about 100,000:1 to about 100:1. Most preferably, the molar ratios of moles of active chromium in the polymerization catalyst system to moles of pyrrole-containing compound is within a range of 25,000:1 to 500:1 in order to optimize the desired resultant polymer properties. Too much pyrrole-containing compound can deactivate the polymerization catalyst system; too little pyrrole-containing compound can result in no alteration of resultant polymer properties and/or low polymerization activity.

The metal alkyl can be any heteroleptic or homoleptic metal alkyl compound. One or more metal alkyls can be used. The ligand(s) on the metal can be aliphatic and/or aromatic. Generally, the ligand(s) are any saturated or unsaturated aliphatic radical. The metal alkyl can have any number of carbon atoms. However, due to commercial availability and ease of use, the metal alkyl usually will comprise less than about 70 carbon atoms per metal alkyl molecule and preferably less than about 20 carbon atoms per molecule. Preferred metal alkyls include, but are not limited to, alkylaluminum compounds, alkylboron compounds, alkylmagnesium compounds, alkylzinc compounds and/or alkyllithium compounds. Exemplary metal alkyls include, but are not limited to, n-butyllithium, s-butyllithium, t-butyllithium, diethylmagnesium, diethylzinc, triethylaluminum, trimethylaluminum, triisobutylaluminum, and mixtures thereof.

Preferably, the metal alkyl is selected from the group consisting of non-hydrolyzed, i.e., not pre-contacted with water, alkylaluminum compounds, derivatives of alkylaluminum compounds, halogenated alkylaluminum compounds, and mixtures thereof for improved resultant polymer characteristics. Exemplary alkylaluminum compounds include, but are not limited to, triethylaluminum, tripropylaluminum, tributylaluminum, diethylaluminum chloride, diethylaluminum bromide, diethylaluminum ethoxide, ethylaluminum sesquichloride, and mixtures thereof for best catalyst system activity and product selectivity. The most preferred alkylaluminum compound is triethylaluminum, for best results in catalyst system activity and product selectivity, as well as commercial availability.

Most preferably, the metal alkyl must be at least one non-hydrolyzed alkylaluminum compound, expressed by the general formulae $AlR_3$, $AlR_2X$, $AlRX_2$, $AlR_2OR$, $AlRXOR$, and/or $Al_2R_3X_3$, wherein R is an alkyl group and X is a halogen atom. Exemplary compounds include, but are not limited to, triethylaluminum, tripropylaluminum, tributylaluminum, diethylaluminumchloride, diethylaluminumbromide, diethylaluminumethoxide, diethylaluminum phenoxide, ethylaluminumethoxychloride, and/or ethylaluminum sesquichloride. Preferably, the activating compound for a trimerization catalyst system is a trialkylaluminum compound, $AlR_3$, for reasons given above. The most preferred trialkylaluminum compound is triethylaluminum, for reasons given above.

The amount of metal alkyl present in the polymerization reactor can be any amount sufficient to aid polymerization of olefins. Generally, the amount of metal alkyl present in the polymerization reactor is within a range of about 0.1 to about 5,000 mg/kg (ppm), based on the mass of diluent in the reactor, preferably within a range of about 1 to about 1,000 mg/kg. Most preferably, the amount of metal alkyl present in the polymerization reactor is within a range of 5 to 500 mg/kg. Too much metal alkyl can deactivate, or kill, the polymerization catalyst system; too little metal alkyl can result in no beneficial effect on the polymerization process.

Reaction Conditions

Polymerization can be carried out in any manner known in the art, such as gas phase, solution or slurry conditions, to effect polymerization. A stirred reactor can be utilized for a batch process, or the reaction can be carried out continuously in a loop reactor or in a continuous stirred reactor.

A preferred polymerization technique is that which is referred to as a particle form, or slurry process, wherein the temperature is kept below the temperature at which polymer goes into solution. Such polymerization techniques are well known in the art and are disclosed for instance, in Norwood, U.S. Pat. No. 3,248,179, the disclosure of which is hereby incorporated by reference.

The preferred temperature in the particle form process is within the range of about 176° to about 230° F. (66° to 110° C.) and preferred pressures for the particle form process can vary from about 110 to about 770 psia (0.76–4.8 MPa) or higher. Two preferred polymerization methods for the slurry process are those employing a loop reactor of the type disclosed in Norwood and those utilizing a plurality of stirred reactors either in series, parallel or combinations thereof wherein the reaction conditions are different in the different reactors. For instance, in a series of reactors, a chromium catalyst system which has not been subjected to the reduction step can be utilized either before or after the reactor utilizing the catalyst system of this invention. In another specific instance, a conventional chromium oxide catalyst on a predominantly silica support can be utilized in a reactor in parallel with a reactor utilizing the catalyst system of this invention and the resulting polymerization influence combined prior to recovering the polymer.

The molecular weight of the polymer can be controlled by various means known in the art such as adjusting the temperature (higher temperature giving lower molecular weight) and introducing additional hydrogen to lower the molecular weight or varying the catalyst system compounds.

Polymer Characteristics

The polymers produced in accordance with this invention have reduced density and broadened molecular weight distribution especially on the low molecular weight side. This polymerization process is most preferably applicable for use with ethylene polymerization, for best in-situ comonomer production.

The addition of the pyrrole-containing compound and metal alkyl will usually result in a polymer with a density within a range of about 0.92 to about 0.97 g/cc, and preferably within a range of about 0.93 to about 0.96 g/cc. Most preferably, the resultant polymer density is within a range of 0.94 to 0.96 g/cc. The polymer product melt index (MI) is usually within a range of about 0.001 to about 100 g/10 rain, and preferably within a range of about 0.01 to about 10 g/10 min. Most preferably, the MI of the resultant polymer is within a range of 0.01 to 5 g/10 min. The high load melt index (HLMI) of the resultant polymer will usually be within a range of about 0.1 to about 100 g/10 rain, and preferably within a range of about 0.1 to about 60 g/10 min. Most preferably, the HLMI is within a range of 1 to 50 g/10 min. The ratio of the HLMI/MI of the resultant polymer is usually within a range of about 30 to about 400, and preferably within a range of about 50 to about 300. Most preferably, the HLMI/MI is within a range of 50 to 200. Polymers with characteristics within the ranges given above are especially useful for applications of blow molding.

A further, non-limiting understanding of the invention can be obtained from the following Examples.

EXAMPLES

The following Examples illustrate, but do not limit, various aspects of the invention. Data are included for each example about the polymerization reaction conditions, as well as the resultant polymer.

Polymer density was determined in grams per cubic centimeter (g/cc) on a compression molded sample, cooled at about 15° C. per hour, and conditioned for about 40 hours at room temperature in accordance with ASTM D1505 and ASTM D1928, condition C. High low melt index (HLMI) was determined in accordance with ASTM D1238 at 190° C. with a 21,600 gram weight. Melt index (MI) was determined according to ASTM D1238 at 190° C., with a 2,160 gram weight.

Example I

A polymerization reaction was completed in a two-liter autoclave reactor at 95° C. using an isobutane slurry. The chromium catalyst system used was Magnapore HT, available from Davison Chemical Company, a division of W. R. Grace, and was one (1) weight percent chromium. The chromium catalyst system was activated at 650° C. for a time of 3 hours in air, and then reduced at 370° C. for a time of 30 minutes in the presence of carbon monoxide. Approximately 0.14 gram of chromium polymerization catalyst system was charged to the reactor; then 0.5 liters of isobutane were added. A solution containing 0.025 mmoles hydrogen pyrrolide ($C_4H_4N$) and 0.046 mmoles triethylaluminum (TEA) in heptane was added to the reactor. The final TEA concentration in the reactor was about 9 mg/kg, based on total reactor diluent. An additional 0.5 liters of isobutane were added and used to flush in the hydrogen pyrrolide and TEA. The chromium polymerization catalyst system was mixed with the hydrogen pyrrolide and TEA in the reactor for approximately 10 minutes before ethylene was added for a final pressure of 550 psig. Ethylene concentration in the polymerization reactor was about 7 to about 8 weight percent. The polymerization time was 65 minutes.

The polymerization reaction produced 53 grams of polymer, with a yield of 342 grams polymer per gram chromium polymerization catalyst system per hour.

Example II

A polymerization reaction was completed in a two-liter autoclave reactor at 95° C. using an isobutane 190 mg/kg, based on reactor diluent, of triethylaluminum (TEA) were added to the reactor along with varying amounts of hydrogen pyrrolide. Ethylene was added at 90° C. for a final pressure of 550 psig.

The results of the polymerization reactions, using an oxidized-only chromium catalyst system, are given Table I.

TABLE I

| Run | Cr catalyst charged, g | $C_4H_5N$ charged $\mu l$ | Polymer yield, g | Activity, g pol/g cat/hr | MI, g/10 min | HLMI, g/10 min | HLMI/MI | Me/1000 C | Observed Density,(a) g/cc | Density, g/cc(b) | Cr/Py, mole ratio |
|---|---|---|---|---|---|---|---|---|---|---|---|
| 301 | 0.2 | none | 127 | 1300 | 0.65 | 55 | 84 | 3.59 | ND(c) | ND(c) | — |
| 302 | 0.1 | none | 6.4 | 130 | 0.002 | 0.5 | 344 | 3.36 | 0.958 | 0.971 | — |
| 303 | 0.1 | none | 8.6 | 170 | 0.002 | 0.9 | 395 | 3.39 | 0.956 | 0.968 | — |
| 304 | 0.2 | 0.13 | 36 | 360 | 0.54 | 35 | 64 | 4.00 | 0.952 | 0.953 | 10,000:1 |
| 305 | 0.2 | 0.65 | 36 | 360 | 1.0 | 53 | 52 | 4.48 | 0.952 | 0.952 | 2,000:1 |
| 306 | 0.2 | 1.3 | 7.8 | 75 | 0.61 | 71 | 117 | 5.92 | 0.958 | 0.959 | 1,000:1 |

(a)Actual, not observed, density; not adjusted for 1 MI.
(b)Density adjusted for 1 MI, using relationship (1 MI Density) = (Density observed) − $\frac{(\text{Log MI observed})}{222.0}$ (c)ND — Not Determined.

slurry. The chromium catalyst system used was Magnapore HT, available from Davison Chemical Company, a division of W. R. Grace, and was one (1) weight percent chromium. The chromium catalyst system was activated at 650° C. for a time of 3 hours in air, and then reduced at 370° C. for a time of 30 minutes in the presence of carbon monoxide. Approximately 0.085 gram of chromium polymerization catalyst system was charged to the reactor; then 0.5 liters of isobutane were added. A solution containing 0.0512 mmoles hydrogen pyrrolide ($C_4H_4N$) and 0.0512 mmoles triethylaluminum (TEA) in heptane was added to the reactor. Final TEA concentration in the reactor was about 10 mg/kg, based on total reactor diluent. An additional 0.5 liters of isobutane were added and used to flush in the hydrogen pyrrolide and TEA. The chromium polymerization catalyst system was mixed with the hydrogen pyrrolide and TEA in the reactor for approximately 10 minutes before ethylene was added for a final pressure of 550 psig. Ethylene concentration in the polymerization reactor was about 7 to about 8 weight percent. The polymerization time was 65 minutes.

The polymerization reaction produced 9 grams of polymer, with a yield of 148 grams polymer per gram chromium polymerization catalyst system per hour.

Example III

The polymerization reactions were completed in a 1 liter autoclave reactor at 90° C. using an isobutane slurry. The chromium catalyst system used was 969 MS available from Davison Chemical Company, a division of W. R. Grace, and was 0.5 weight percent chromium on a Grace, grade 952 silica, prepared in accordance with U.S. Pat. No. 3,887,494. The chromium catalyst system was activated in air at 850° C. for three hours prior to use. Approximately 0.1 to 0.2 grams of chromium catalyst system were charged to the reactor; then 0.5 liters of isobutane were added. 0.5 millimole, about Example IV The polymerizations for the following runs were completed similar to that described in Example III.

However, the chromium catalyst system used was 969MS catalysts available from Davison Chemical Company, a division of W. R. Grace, and was 0.5 weight percent chromium on a Grace, Grade 952 silica prepared in accordance with U.S. Pat. No. 3,887,494. The chromium catalyst system was activated in air at a temperature of 850° C. for three hours, then cooled to 370° C., flushed-with nitrogen and reduced in carbon monoxide at 350° C. for thirty minutes, and finally flushed with nitrogen.

The results of the polymerization reactions, using an oxidized and subsequently carbon monoxide reduced chromium catalyst system, are given below in Table II.

TABLE II

| Run | Cr Catalyst Charged, g | $C_4H_5N$ charged, $\mu l$ | Polymer Yield, g | Activity, g pol/g cat/hr | MI, g/10 min. | HLMI, g/10 min | HLMI/MI | Me/1000 C | Observed Density, g/cc(a) | Cr/Py, mole ratio |
|---|---|---|---|---|---|---|---|---|---|---|
| 401 | 0.2 | none | 87 | 830 | 0.003 | 0.9 | 290 | 3.76 | 0.948 | — |
| 402 | 0.2 | 0.13 | 90 | 900 | 0.054 | 5 | 93 | 4.72 | 0.947 | 10,000:1 |
| 403 | 0.2 | 0.65 | 82 | 740 | 0.012 | 2 | 150 | 4.20 | 0.950 | 2,000:1 |
| 404 | 0.2 | 1.3 | 54 | 940 | 0.013 | 2 | 150 | 4.61 | 0.946 | 1,000:1 |

(a)Actual, observed density; not adjusted for 1 MI.

The data in Table I show that even though the observed density remains about the same when increasing amounts of hydrogen pyrrolide are added, the number of methyl groups per 1,000 backbone carbon atoms, an indication of branching and comonomer production and incorporation increases. The increased Me/1000 C value is indicative of additional branching on the polymer backbone.

The data in Table II indicate that, as with Example III, the observed density of the resultant polymer remains about the same, however, the number of methyl groups per 1,000 backbone carbon atoms is higher than when no hydrogen pyrrolide is used, as in Run 401.

While this invention has been described in detail for the purpose of illustration, it is not to be construed or limited thereby. This detailed description is intended to cover all changes and modifications within the spirit and scope thereof.

That which is claimed is:

1. A catalyst system composition comprising:
   (a) chromium oxide supported on an inorganic oxide support;
   wherein said chromium supported on an inorganic oxide support has been oxidized at a temperature within a range of about 300° to about 1000° C. for a time within a range of about 30 minutes to about 50 hours;
   (b) a pyrrole-containing compound; and
   (c) a non-hydrolyzed metal alkyl.

2. A composition according to claim 1 wherein said inorganic oxide support is selected from the group consisting of silica, silica-alumina, alumina, fluorided alumina, silated alumina, thoria, aluminaphosphate, aluminum phosphate, phosphated silica, phosphated alumina, silica-titania, co-precipitated silica/titania, fluorided/silated alumina, and mixtures thereof.

3. A composition according to claim 1 wherein said chromium supported on an inorganic oxide support is contacted with carbon monoxide at a temperature within a range of about 200° to about 500° C. for a time within a range of about 30 minutes to about 50 hours, subsequent to said oxidation.

4. A composition according to claim 1 wherein said pyrrole-containing compound is selected from the group consisting of hydrogen pyrrolide, derivatives of pyrrole, and mixtures thereof.

5. A composition according to claim 4 wherein said pyrrole-containing compound is hydrogen pyrrolide.

6. A composition according to claim 1 wherein said non-hydrolyzed metal alkyl is selected from the group consisting of aluminum alkyls, lithium alkyls, magnesium alkyls, zinc alkyls, and mixtures thereof.

7. A composition according to claim 6 wherein said non-hydrolyzed metal alkyl compound is an aluminum alkyl compound.

8. A composition according to claim 7 wherein said aluminum alkyl compound is a trialkyl aluminum compound.

9. A composition according to claim 8 wherein said trialkyl aluminum compound is triethylaluminum.

10. A catalyst system composition comprising:
    (a) chromium oxide supported on an inorganic oxide support;
    (b) hydrogen pyrrolide; and
    (c) triethylaluminum.

11. A catalyst system composition consisting essentially of:
    (a) chromium oxide supported on an inorganic oxide support;
    (b) a pyrrole-containing compound; and
    (c) a non-hydrolyzed metal alkyl.

12. A composition according to claim 11 wherein said inorganic oxide support is selected from the group consisting of silica, silica-alumina, alumina, fluorided alumina, silated alumina, thoria, aluminaphosphate, aluminum phosphate, phosphated silica, phosphated alumina, silica-titania, co-precipitated silica/titania, fluorided/silated alumina, and mixtures thereof.

13. A composition according to claim 11 wherein said chromium supported on an inorganic oxide support is oxidized at a temperature within a range of about 300° to about 1,000° C. for a time within a range of about 30 minutes to about 50 hours.

14. A composition according to claim 13 wherein said chromium supported on an inorganic oxide support is contacted with carbon monoxide at a temperature within a range of about 200° to about 500° C. for a time within a range of about 30 minutes to about 50 hours, subsequent to said oxidation.

15. A composition according to claim 11 wherein said pyrrole-containing compound is selected from the group consisting of hydrogen pyrrolide, derivatives of pyrrole, and mixtures thereof.

16. A composition according to claim 15 wherein said pyrrole-containing compound is hydrogen pyrrolide.

17. A composition according to claim 11 wherein said non-hydrolyzed metal alkyl is selected from the group consisting of aluminum alkyls, lithium alkyls, magnesium alkyls, zinc alkyls, and mixtures thereof.

18. A composition according to claim 17 wherein said non-hydrolyzed metal alkyl compound is an aluminum alkyl compound.

19. A composition according to claim 18 wherein said aluminum alkyl compound is a trialkyl aluminum compound.

20. A composition according to claim 19 wherein said trialkyl aluminum compound is triethylaluminum.

21. A catalyst system composition consisting essentially of:
    (a) chromium oxide supported on an inorganic oxide support;
    (b) hydrogen pyrrolide; and
    (c) triethylaluminum.

* * * * *